Aug. 16, 1955    C. F. YATES ET AL    2,715,331
DEVELOPMENT OF FLUID PRESSURES FOR TRANSDUCER
CALIBRATION AND THE LIKE
Filed Oct. 18, 1952
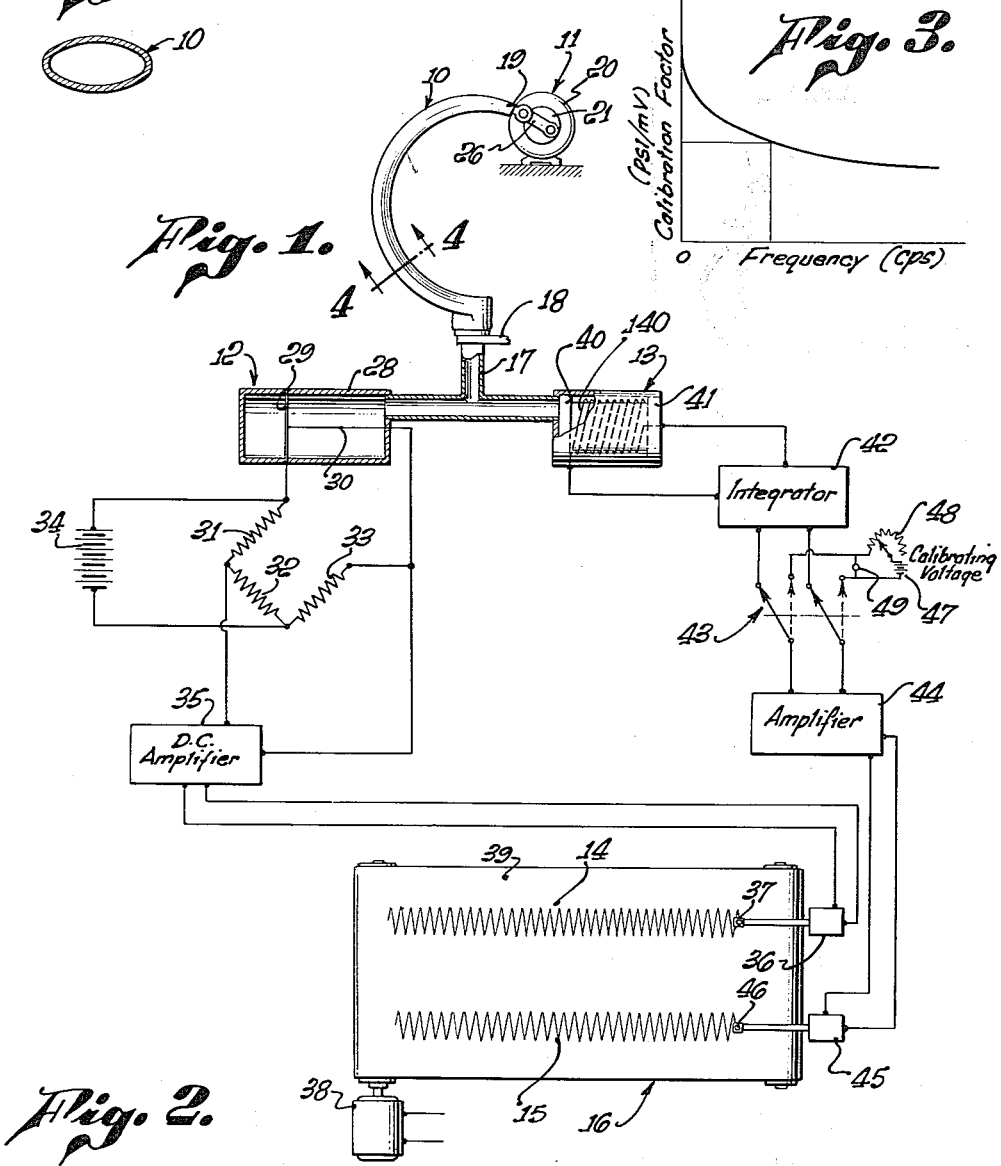
CECIL F. YATES,
RAYMOND C. BAIRD,
RAY C. SOLLARS,
INVENTORS.
BY *[signature]*
ATTORNEY.

United States Patent Office 2,715,331
Patented Aug. 16, 1955

2,715,331

DEVELOPMENT OF FLUID PRESSURES FOR TRANSDUCER CALIBRATION AND THE LIKE

Cecil F. Yates, North Hollywood, and Raymond C. Baird and Ray C. Sollars, Los Angeles, Calif., assignors to The Fluor Corporation, Ltd., Los Angeles, Calif., a corporation of California Application October 18, 1952, Serial No. 315,536

8 Claims. (Cl. 73—1)

This invention relates to apparatus for producing controlled fluid pressures, typically for test or calibration purposes, and in certain respects is particularly concerned with improved systems for calibrating pressure responsive transducers.

A major object of the present invention is to provide apparatus for producing a very positive and reliable fluid pressure, which if desired may easily be varied in a manner giving it a sinusoidal or other regular wave form. In particular, the controlled pressure is achieved by utilizing as a pressure controlling or producing element a Bourdon tube, such as has been used in the past for indicating fluid pressures. Instead of applying pressure to the inside of this tube, as is customary in the normal use of a Bourdon tube, we mechanically actuate the tube, as by moving one of its ends relative to the other, in a manner varying the tube curvature and thereby causing a change in volume of the tube and a corresponding change in pressure of the contained fluid. To produce an alternately increasing and decreasing pressure in the tube, one of the tube ends may be reciprocated relative to the other, with the frequency and amplitude of the resulting pressure wave being determined by the frequency and amplitude of the tube end reciprocations. A suitable power unit, such as an electric motor, may be employed for driving the Bourdon tube, preferably through a variable speed transmission and an adjustable amplitude crank arrangement.

The pressure output of a Bourdon tube driven in this manner is especially useful in calibrating a pressure responsive transducer, that is, a device which converts pressure variations to electric signal variations. When the device is used for this purpose, the pressure variations produced by the driven tube are preferably transmitted simultaneously to both the transducer which is to be calibrated, and a second transducer of known calibration. The electric signal outputs of the two transducers may then be compared, as by utilizing them to form graphs on an oscillograph or the like, and the two graphs compared to determine the calibration of one transducer from the other. Such a calibrating system has proven especially helpful in calibrating a dynamic type transducer, which responds only to changes in fluid pressure, as distinguished from a strain gauge type transducer, which indicates pressures and not pressure changes directly. In calibrating a dynamic transducer, it is necessary to have a source of very accurately and regularly varying pressure, a use for which the sinusoidal pressure output of a reciprocating Bourdon tube is well adapted.

The above and other features and objects of the present invention will be better understood from the following detailed description of the typical embodiment illustrated in the accompanying drawing in which:

Fig. 1 is a schematic representation of a transducer calibrating system embodying the invention;

Fig. 2 is an enlarged fragmentary view of the Bourdon tube actuating mechanism of Fig. 1;

Fig. 3 shows a calibration graph plotted from information derived by use of the Fig. 1 apparatus; and Fig. 4 is a transverse section through the Bourdon tube of Fig. 1, and taken on line 4—4 of that figure.

Referring first to Fig. 1, we have shown at 10 a Bourdon tube which according to the invention is power actuated by a drive unit 11. The variations in pressure produced by actuation of the Bourdon tube are communicated to a pair of transducers 12 and 13, which produce electrical signals controlling the formation of a pair of graphs 14 and 15 representing the pressure variations on oscillograph 16. The Bourdon tube 10 is of conventional construction, comprising an arcuately curved flexible preferably resilient tube of the essentaily elliptical or oval transverse configuration shown in Fig. 4. A pressure fluid, preferably a liquid, is contained within tube 10, in communication with a line 17 leading to the two transducers. The lower end of the tube, which communicates with line 17, is stationarily mounted in any suitable manner, as for instance by a bracket 18. The other end 19 of the Bourdon tube is deflectible in a manner varying the longitudinal curvature of the tube, to correspondingly vary the volume of the tube and thus change the pressure of the contained liquid.

The Bourdon tube drive unit 11 comprises means for oscillating or reciprocating the free end of the tube in a manner producing an alternately increasing and decreasing pressure within the tube. Preferably, drive unit 11 comprises an electric motor 20 connected to the Bourdon tube through an adjustable crank connection. The crank connection may include a disc 21 driven by the motor shaft and containing an eccentric circular opening 22, see Fig. 2, within which is rotatably received a second disc 23. This disc 23 may be fastened in any desired rotary position within disc 21, as by a set screw 24, and is pivotally and eccentrically attached at 25 to one end of a link 26, whose other end is pivoted to the Bourdon tube at 27. As will be understood, rotary adjustment of disc 23 within the larger disc 21 varies the distance of the pivotal axis 25 from the motor axis, to thus vary the extent of reciprocation of the Bourdon tube. When motor 20 is energized to reciprocate the end 19 of the Bourdon tube, the pressure of the fluid within the Bourdon tube has essentially a sinusoidal wave form.

One of the transducers 12 is of a type whose calibration is known, and for this purpose preferably of the strain gauge type, since the calibration of a strain gauge transducer may be easily determined statically by use of a manometer. This strain gauge transducer is typically represented as comprising a fluid-tight housing 28 containing a deflectible diaphragm 29 which is subjected at one side to the pressure communicated from Bourdon tube 10. A resistance wire 30, typically formed of constantan is connected at its opposite ends to diaphragm 29 and housing 28, to be tensioned and thus have its resistance varied in accordance with variations in the Bourdon tube pressures. These variations in the resistance of wire 30 are utilized to control an electrical signal for actuating oscillograph 16, and for this purpose the wire 30 may be connected as one leg of a Wheatstone bridge circuit, whose other legs are formed by resistors 31, 32 and 33. The circuit may be energized by a battery 34, with the output signal being delivered to an amplifier 35, from which it is fed to a first pen motor 36 of the oscillograph. Motor 36 acts to vertically displace pen 37 of the oscillograph in accordance with variations in the signal from amplifier 35, so that as paper drive motor 38 of the oscillograph advances paper 39 to the left, the pen acts to form the graph 14 representing variations in the Bourdon tube pressure.

The second transducer 13 is the one which is to be calibrated, and is typically of the dynamic type, so that it can be calibrated only by varying pressures and not by a static pressure manometer process. This dynamic transducer typically includes a bar 40 of a magnetostrictive material, such as nickel, contained within a housing 41 and subjected at one end to fluid pressure communicated from the Bourdon tube 10. Variations in the fluid pressure from the Bourdon tube vary the compression of the magnetostrictive element 40, which produces a correspondingly varying magnetic field acting to induce in an output coil 140 about element 40 an electrical signal whose voltage varies in accordance with the rate of change of compression of element 40. This electrical signal is passed through an electronic integrator 42, which integrates the signal to one varying directly in accordance with the pressure variations, rather than the rate of change of the pressure. The integrated signal may be passed through a two pole double throw switch 43, to an amplifier 44, from which an amplified signal is fed to a second pen motor 45 actuating pen 46 to form the lower curve 15 on the oscillograph paper. Switch 43 may be actuated to the broken line position of Fig. 1, in which the signal fed to the amplifier 44 and pen motor 45 comes from a variable calibrating voltage supply, such as a battery 47 connected in series with a rheostat 48.

In plotting a calibration curve of the type shown in Fig. 3 for the transducer 13, a number of different points on the curve are determined by driving motor 20 at different speeds, to produce oscillating pressures of a number of different frequencies within the Bourdon tube. For each frequency, the motor is driven with switch 43 in its full line Fig. 1 position, to form on oscillograph 16 two curves 14 and 15 representing the variations in Bourdon tube pressure. Since the calibration of transducer 12 is known, the extent of variation of pressure in the Bourdon tube may be determined from the upper graph 14. This determination tells an operator what pressure the vertical displacement of the lower graph 15 represents. The operator then actuates switch 43 to its broken line position, and adjusts rheostat 48 to a condition causing movement of pen 46 to a point even with the crests formed by curve 15. The calibrating voltage is then read on a millivolt meter 49, to determine the E. M. F. of the signal supplied from integrator 42 during the formation of the curve 15. Having thus determined both the pressure variation in the Bourdon tube in pounds per square inch for the particular frequency setting, and the E. M. F. of the signal from the integrator produced by that pressure variation, we may then easily calculate the calibration factor in pounds per square inch per millivolt for that particular frequency. This process is repeated for a number of different frequencies, to form the calibration curve of Fig. 3. The frequency of operation is of course determined in each instance from the speed of rotation of the motor.

We claim:

1. Apparatus for producing an alternately increasing and decreasing pressure comprising a closed fluid containing system including a longitudinally curved resiliently flexible fluid containing Bourdon tube, means stationarily mounting one end of said tube, and means for reciprocating the second end of said tube to vary the curvature thereof, said last mentioned means comprising an element rotatable about an axis, a power unit operable to rotate said element about said axis, and a link connected to said second end of the tube and to said rotatable element at a location offset from said axis, said system being sealed against fluid flow thereinto or therefrom during said reciprocation of the tube.

2. Apparatus for producing an alternately increasing and decreasing pressure comprising a closed fluid containing system including a longitudinally curved resiliently flexible fluid containing Bourdon tube, means stationarily mounting one end of said tube, and means for reciprocating the second end of said tube to vary the curvature thereof, said last mentioned means comprising an element rotatable about an axis, a power unit operable to rotate said element about said axis, a link connected to and extending between said second end of the tube and said rotatable element, and a connection operable to adjustably attach said link to said element at any of a plurality of locations offset different distances from said axis, said system being sealed against fluid flow thereinto or therefrom during said reciprocation of the tube.

3. Apparatus for producing an oscillating alternately increasing and decreasing fluid pressure comprising a closed fluid containing system including a longitudinally curved flexible fluid containing Bourdon tube, a drive unit exerting against said tube near a first end thereof forces acting to reciprocate the tube at that end, and means holding the tube near a second end against reciprocation so that the drive unit acts to alternately increase and decrease the curvature of the tube and thereby produce said oscillating pressure in the tube, said system being sealed against fluid flow thereinto or therefrom during said reciprocation of the tube.

4. Apparatus as recited in claim 3, in which said drive unit includes an electrically operated driving motor.

5. Apparatus for calibrating a transducer comprising a closed fluid containing system including a longitudinally curved flexible Bourdon tube containing fluid, a drive unit exerting against said tube near a first end a force acting to reciprocate the tube, means holding the tube near a second end against movement so that the drive unit acts to vary the curvature of the tube and thereby vary the fluid pressure therein, means for connecting to said system a transducer which is to be calibrated and is operable to produce a first electric signal representing said pressure, a transducer of known calibration connected to said system and subjected to said fluid pressure and operable to produce a second electric signal, and indicator means responsive to said signals.

6. Apparatus for calibrating a transducer comprising a closed fluid containing system including a longitudinally curved flexible Bourdon tube containing fluid, a power actuated drive unit exerting against said tube near a first end forces acting to reciprocate the tube at that end, means holding the tube near a second end against reciprocation so that the drive unit acts to alternately increase and decrease the curvature of the tube and thereby produce an oscillating fluid pressure in the tube, means for connecting to said system a transducer which is to be calibrated and is operable to produce a first electric signal representing said pressure, a transducer of known calibration connected to said system and subjected to said fluid pressure and operable to produce a second electric signal, and indicator means responsive to said signals.

7. Apparatus for calibrating a transducer comprising a closed fluid containing system including a longitudinally curved flexible Bourdon tube containing fluid, a power actuated drive unit exerting against said tube near a first end forces acting to reciprocate the tube at that end, means holding the tube near a second end against reciprocation so that the drive unit acts to alternately increase and decrease the curvature of the tube and thereby produce an oscillating fluid pressure in the tube, means for connecting to said system a dynamic transducer which is to be calibrated and is operable to produce a first electric signal representing changes in said pressure, a dynamic transducer of known calibration connected to said system and subjected to said fluid pressure and operable to produce a second electric signal, an electronic integrator responsive to said first signal to produce an integrated electric signal varying in accordance with said pressure, and oscillograph means responsive to said integrated signal and said second signal and acting to produce graphs varying in accordance therewith.

8. Apparatus as recited in claim 7, in which said drive unit comprises an element rotatable about an axis, a motor rotating said element about said axis, a reciprocating link connected to and extending between said first end of said tube and said rotatable element, and a radially adjustable connection operable to pivotally attach said link to said element at any of a plurality of distances from said axis.

References Cited in the file of this patent

UNITED STATES PATENTS

| | | |
|---|---|---|
| 1,575,519 | Amsler | Mar. 2, 1926 |
| 1,638,100 | Roucka | Aug. 9, 1927 |
| 1,903,713 | Baule | Apr. 11, 1933 |
| 2,574,475 | Grogan | Nov. 13, 1951 |
| 2,604,781 | Bechtold et al. | July 29, 1952 |

OTHER REFERENCES

Apparatus for Imposing and Measuring Rapid Changes in Gases, Coffin et al., Review of Scientific Instruments vol. 23, No. 3, March 1952, pp. 115–118.